Sept. 4, 1934.   A. B. RYPINSKI   1,972,319
COIL FOR SLOW ELECTROMAGNETS AND REACTORS
Filed May 18, 1933   3 Sheets-Sheet 1
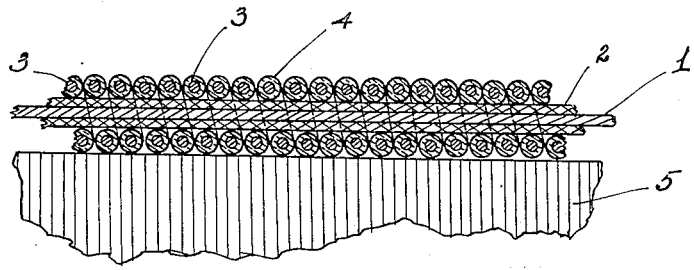
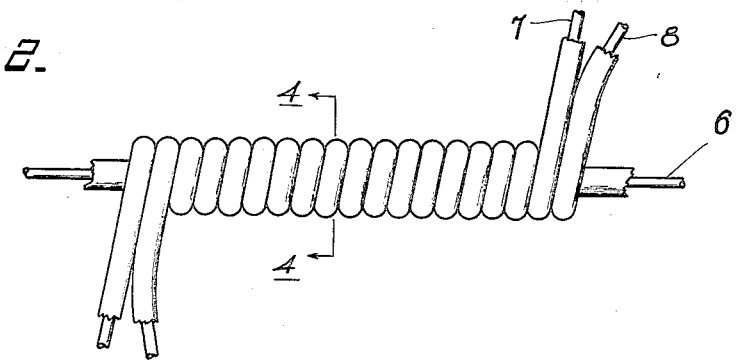
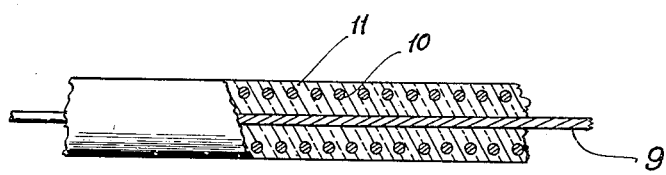
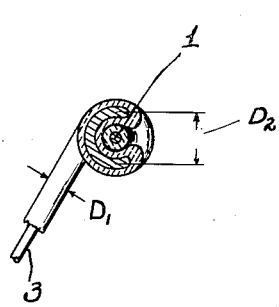
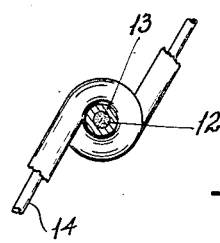
Inventor
ALBERT B. RYPINSKI
By John B. Brody
Attorney Sept. 4, 1934.  A. B. RYPINSKI  1,972,319
COIL FOR SLOW ELECTROMAGNETS AND REACTORS
Filed May 18, 1933  3 Sheets-Sheet 2
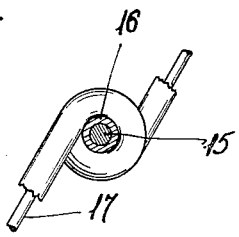
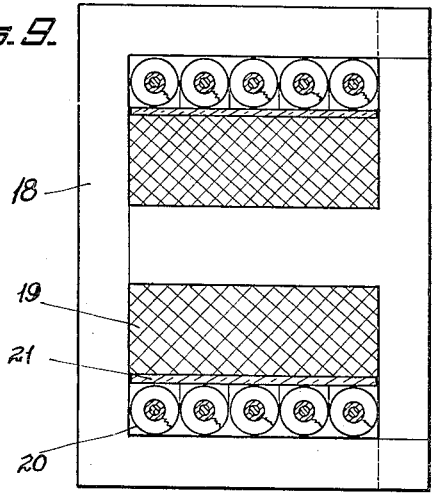
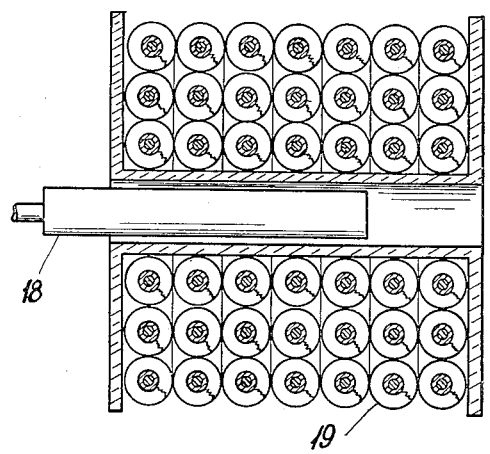
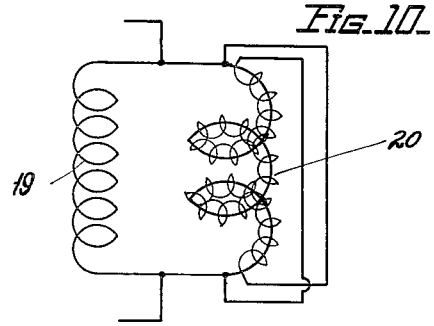
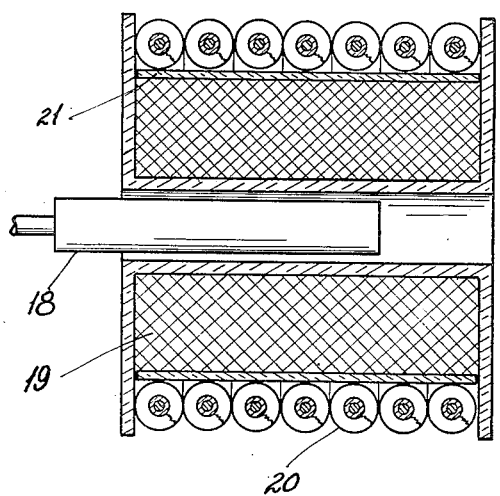
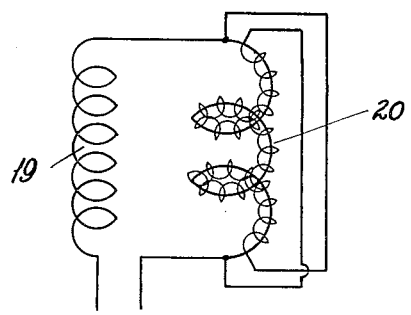
Inventor
ALBERT B. RYPINSKI
By John C. Brady
Attorney Sept. 4, 1934.  A. B. RYPINSKI  1,972,319
COIL FOR SLOW ELECTROMAGNETS AND REACTORS
Filed May 18, 1933  3 Sheets-Sheet 3
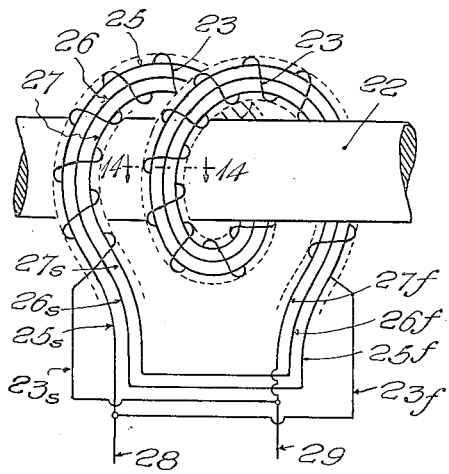
FIG. 12
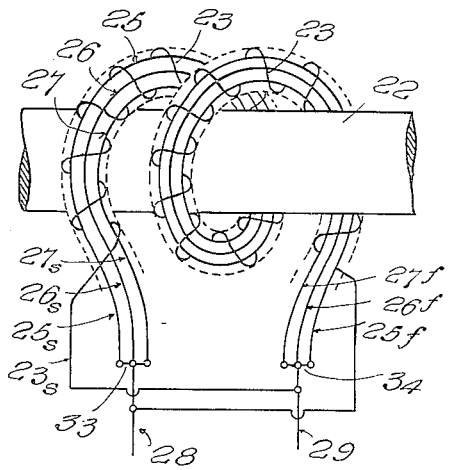
FIG. 13
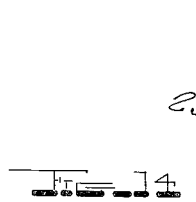
FIG. 14
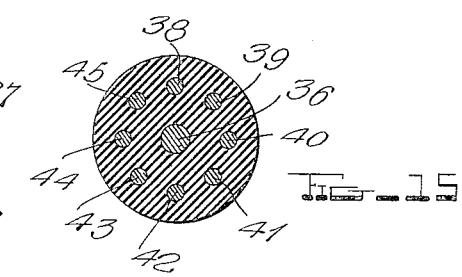
FIG. 15
FIG. 16
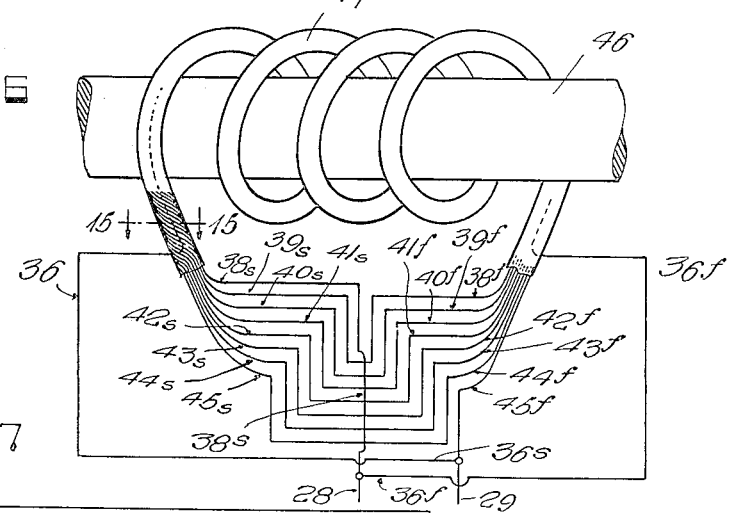
FIG. 17
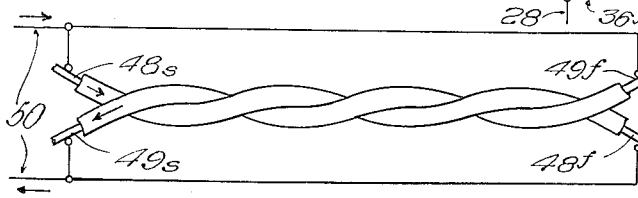
INVENTOR.
Albert B. Rypinski,
BY John O. Brady
ATTORNEY Patented Sept. 4, 1934

1,972,319

UNITED STATES PATENT OFFICE 1,972,319.

COIL FOR SLOW ELECTROMAGNETS AND REACTORS

Albert E. Rypinski, Laurelton, Long Island, N. Y.

Application May 18, 1933, Serial No. 671,768

26 Claims. (Cl. 175—359)

My invention relates broadly to slow electromagnets and reactors of the class set forth more fully in my co-pending applications Serial No. 416,877, filed December 27, 1929 and Serial No. 608,095, filed April 28, 1932.

One of the objects of my invention is to produce a multiple conductor which can be stocked and sold ready for winding into coils as magnet wire is now stocked and sold, the difference being that the conductor of my invention, when wound and properly connected, will produce delayed instead of instantaneous magnetic effects.

A further object of my invention is to produce a multiple conductor for the purpose described in which there is practically no magnetic leakage of one conductor as against the other, that is, all the flux produced by one conductor threads through the others.

Another object of my invention is to produce a multiple conductor for the purpose described in which there is an inner conductor and one or more outer conductors, electrical and heat insulation between the inner and outer conductors, the outer conductors preventing the insulation between the two escaping even if it should reduce to a powder by the heat.

Still another object of my invention is to produce a multiple conductor for the purpose described in which the heat generated in the inner conductor has to pass through the outer conductors and thus increase the temperature of the outer conductors to a higher point than if there were no heat from the inner conductor.

A further object of my invention is to produce a multiple conductor for the purpose described with an inner conductor of high specific resistance, low temperature coefficient of resistance material and an outer conductor of low specific resistance, high temperature coefficient of resistance material, the conductors arranged so that the extra length of the outer one compensates for the difference in specific resistance and results in a combined conductor whose inner and outer parts are of equal resistance at a selected temperature.

A still further object is to produce a multiple conductor for the purpose described in which the inner conductor consists of one or more straight wires and the outer conductor is wound in spiral formation over the insulation covering the inner one, the outer conductor consisting of one or more wires.

Another object of my invention is to produce a multiple conductor for the purpose described in which the inner conductor is practically completely surrounded by the outer one, the outer conductor wound in close spiral formation or laid parallel or twisted around the inner in a long spiral.

Another object of my invention is to produce a duplex conductor for the purpose described in which the increase in resistance voltage drop in one of the conductors is balanced by a corresponding decrease in the resistance voltage drop in the other conductor.

Still another object of my invention is to produce the result just described and other results involving a decreasing resistance voltage drop with increasing load by using carbon as one of the conductors coacting magnetically with each other.

A further object of my invention is to utilize the dissimilar heating under load of such metals as steel and copper by using bimetal conductor, that is, conductor made up of both these metals, or others, one metal forming an integral welded shell over the other.

A still further object of my invention is to use conductors for the purpose described having one metal as a concentric shell over a different metal in which the "skin effect" on alternating currents acts to intensify the change in magnetism of the coil.

Another object of my invention is to make up coils partly of plain conductor to produce instantaneous magnetic effects and partly of duplex spiral conductor to produce delayed electromagnetic effects.

Other and further objects of my invention will be more fully understood from the specification hereinafter following by reference to the accompanying drawings, in which:

Figure 1 is a cross-sectional view taken through a coil constructed by use of the electrical conductor of my invention; Fig. 2 is an elevational view of a conductor constructed in accordance with my invention; Fig. 3 is a cross-sectional view through a multiple conductor constructed in accordance with my invention; Fig. 4 is a cross-sectional view taken through the assembly of conductors illustrated in Fig. 2, the said view being taken on line 4—4 of Fig. 2; Fig. 5 shows a modified form of conductor embodying my invention; Fig. 6 shows a further modified form of conductor constructed in accordance with my invention; Fig. 7 is a cross-sectional view of a slow electromagnet wound with duplex conductor, one spiralled over the other; Fig. 8 is a cross-sectional view of another modified form of slow electromagnet where the change in magnetism is a percentage of the total coil magnetism; Fig. 9 illustrates my invention applied to a reactor; Fig. 10 shows the connection of the coil in Fig. 8 where the spiral duplex conductor 20 is in parallel with the single conductor 19; Fig. 11 shows the same coil where the spiral duplex conductor 20 is in series with the single conductor 19; Fig. 12 schematically shows a modification of the duplex conductor of my invention wherein the inner conductor is composed of several wires in series; Fig. 13 schematically shows a similar modification wherein the several wires of the inner conductor are connected in parallel; Fig. 14 is a sectional view of the multiple conductor employed in the connections of Figs. 12 and 13; Fig. 15 is a cross-sectional view of the multiple conductor employed in Fig. 16; Fig. 16 schematically shows one arrangement and connections of the conductor shown in Fig. 15 when applied to a coil; and Fig. 17 shows a further modified form of construction of the duplex conductor of my invention.

In a slow electromagnet or circuit controller as shown in my co-pending applications #416,877 and #608,095, the winding ordinarily consists of two conductors wound over the same core in magnetic opposition, one at least arranged to change in temperature and resistance to alter the net magnetic result with time. This application provides a novel means of accomplishing this result.

Referring to the drawings in detail, reference character 1 in Fig. 1 illustrates a conductor of suitable material and cross-section covered with electrical and heat resisting material 2. A second conductor 3, covered with electrical and heat resisting insulation 4 is wound in a close spiral over the insulation 2 covering conductor 1. The outer conductor may consist of several conductors wound on simultaneously. Fig. 2 shows an inner conductor 6 covered by two outer conductors 7 and 8. The inner conductor may be split into several parts which may be connected in series or in parallel. The outer conductors may be connected in series or in parallel with each other to vary the characteristics of the completed coil. Figs. 12, 13 and 16 illustrate such connections.

It will be noted that the insulation 2 in Fig. 1 is trapped between the inner and outer conductors and is, therefore, held in place even if it should become powdered by the heat and mechanical strains to which it is subjected. The inner conductor may be of low temperature coefficient material and the outer one of higher coefficient material or vice versa. They may both be of the same coefficient material if arranged so that the temperature of one rises more than the other. The energy liberated in each may be proportioned to produce a temperature difference between the inner and outer conductors or the outer conductor may be artificially cooled while the inner one is encased in heat insulation or in other ways a difference may be set up between the two.

It is clear that if two conductors are in magnetic opposition and a change in resistance of one or both is relied on to produce a resultant change in magnetism, leakage of magnetism, that is, magnetism produced by one which does not thread the other, will act to reduce the effect of changing resistance. With one conductor spiralled over the other, as in Fig. 1, any magnetism originating in either conductor must cut through the other in order to get into the core 5. A coil built of this multiple conductor will produce a greater magnetic effect with heat than one similar in other respects but with magnetic leakage between conductors.

A multiple conductor, Fig. 3, may be made up of an inner straight wire 9 with the spiral conductor 10 covered with an insulation 11, the whole conductor presenting the appearance of an ordinary multiple conductor cable. Obviously, this could be stocked, sold and used as a completed article of manufacture. If wound on a coil and the conductors connected in parallel and magnetic opposition, a delayed magnetic effect would result instead of the usual practically instantaneous magnetic effects. Part of the heat produced in the inner conductor necessarily passes out through the outer one, assisting in raising the temperature of the latter. If the turns of the spiral conductor are spread apart, this effect is reduced. Various methods of effecting the transfer of heat into or out of either conductor may be employed. Extra conductors, inductively or non-inductively wound, may be introduced into the cable for the purpose of heating or affecting the heating of the conductors.

The spiral conductor may be many times the length of the straight one, thus permitting the use in parallel of very dissimilar metals. For instance, it is of advantage to make the central conductor 1, Fig. 4, high resistance material such as nichrome, having a very low temperature coefficient of resistance but a specific resistance of 675 ohms per circular mil. foot. Its high resistance will cause it to liberate a relatively large amount of heat per foot length and it will assist greatly in bringing the spiral outer conductor 3 up to a high temperature. The outer conductor may be of nickel so that it will not oxidize under the high temperature. Nickel has a specific resistance of 58 ohms per circular mil. foot, roughly one-tenth that of nichrome. If the two wires were laid side by side instead of one spiralled over the other and they had to be equal in resistance, the nichrome would need to be over ten times the cross-section of the nickel. In the spiral arrangement, if 1 and 3 have the same overall diameter and D2 is made three times D1, about 10 feet of 3 is used for each foot of 1, and the resistances can very easily be equalized. It will be seen that it is practical to produce a flexible easily worked conductor with the spiral arrangement whereas if laid side by side, the heavy nichrome would make the combined conductor hard to handle in addition to the electrical disadvantages. While the spiralled on conductor is the preferred form of my invention, I do not limit myself thereto. I may employ a single central conductor with a number of other conductors running parallel thereto as is common in cable manufacture. By connecting the many outer conductors in series at their ends and connecting the group of series conductors in parallel with and magnetically opposed to the inner conductor, I can attain practically the same results of eliminating magnetic leakage and producing the changes in magnetism with heat that are accomplished with the spiral conductors. Fig. 16 illustrates such an arrangement.

Referring to Fig. 5, the inner conductor 12 may be carbon or other negative temperature coefficient of resistance material encased in a tube 13 of high resistance low coefficient material and the insulated outer conductor 14 spiralled over the combination. The carbon will lose resistance as it heats and the outer conductor 14 will gain resistance as it heats and the resultant change in current split will be greater than if there were no carbon. A duplex conductor made up as in Fig. 5 is particularly useful in coils whose impedance voltage drop must decrease with time as in reactors as described in my copending application Serial No. 608,095, hereinbefore referred to. If the materials used are of positive temperature coefficient material, the resistance voltage drop of the coil increases with temperature and it is necessary for the inductive reactance voltage to fall enough to overcome this rise before the impedance voltage can show a decrease. If one conductor of the two is of negative coefficient material, the positive and negative coefficients will offset each other, the resistance voltage will be constant, and the impedance voltage will fall as the magnetism decreases. If one winding has a zero coefficient and the other a negative coefficient the resistance voltage will decrease with load and assist in lowering the impedance voltage. All of these effects may be attained using a conductor built as in Fig. 5.

By the use of two dissimilar metals in one or both of the conductors, see Fig. 6, the high specific resistance of such metals as steel may be utilized to increase conductor heating while the low specific resistance of copper and other metals may be utilized to decrease resistance drop. In Fig. 6, 15 may be a steel core welded to a copper shell 16 which in turn is surrounded by the insulated outer conductor 17. The arrangement may be reversed with the duplex metal in the outer conductor. If the shell 16, Fig. 6, is of steel or other high specific resistance metal and the core 15 of copper or other low specific resistance metal, advantage may be taken of the well known "skin effect" on alternating currents, causing the current to crowd near the periphery of a conductor and thin out at its center. The effect varies in degree with the current and its frequency.

On moderate currents the copper will carry the greater percentage, the losses and heat will be moderate and there will be no slow magnet effect. With heavier currents the "skin effect" will become effective and force an undue percentage of current into the steel shell, intensifying the heating and the slow magnet effect. Coils may be made as in Fig. 7 where an electromagnet with its core 18 has a winding 19 composed entirely of duplex conductor, one spiralled over the other.

For many uses where the required change in magnetism due to the slow magnet effect is only a percentage of the total coil magnetism it is advantageous to wind the coil as in Fig. 8 where 18 is the core, 19 is the usual type of electromagnet winding and 20 is the differential winding to produce the slow effect. Heat insulation 21 is shown between the duplex spiral conductor 20 producing the slow magnet effect and the usual electromagnet winding 19.

Ordinary electromagnetic windings operate at temperatures less than 50° C., whereas the duplex conductors of my invention will ordinarily require a temperature of 50° C. or above to operate.

Fig. 9 shows my invention applied to a reactor. The slow magnet winding 20 may be connected in parallel with the winding 19 as shown diagrammatically in Fig. 10 or it may be connected in series with it as shown in Fig. 11. Either one will produce the slow magnet effect but the currents and voltages will vary in the various parts of the circuit in ways well understood in the art.

Figs. 12 and 13 illustrate the connection of a coil of a spiral wound duplex conductor wherein the inner conductor is composed of several wires insulated from each other. In Fig. 12, a core or form 22 has a spiral wound duplex conductor laid over it, the conductor being made up of a wire 23 wound spirally around a bundle of insulated wires 25, 26, 27. The line wire 28 connects to the junction of the end 23f of spiral wire 23 and to the end 25s of one of the wires making up the inner conductor. The end 25f is connected to the beginning of wire 26, which is end 26s, and the end 26f is connected to the end 27s of wire 27. The end 27f of wire 27 joins with the remaining end 23s of the spiral wire 23, and the line wire 29 is joined to their junction. The inner wires are thus in series with each other and assisting each other magnetically, and the series group is in parallel with and magnetically opposed to the spiral wire.

Fig. 13 shows a similar coil but the wires 25, 26 and 27 are all connected in parallel and their junctions 33 and 34 are connected with the opposite ends of the spiral wire 23, and with line wires 28 and 29. The inner wires are thus in parallel with and assisting each other magnetically, and in parallel with and magnetically opposed to the outer spiral conductor.

Fig. 14 is a sectional view of the conductor used in the connections of Figs. 12 and 13. The three central strands forming one conductor are shown at 25, 26 and 27; and the cut view of the single spiral strand forming the outer conductor is shown at 23. Insulation 24 is disposed between all strands.

Figs. 15 and 16 illustrate one form of conductor and coil with a single inner conductor and multiple outer conductors. In Fig. 15, the inner wire 36 is surrounded by insulation 37 and a series of wires 38 to 45, inclusive, which may be laid parallel to 36 or spiralled on with a long pitch as is common in cable manufacture.

Fig. 16 shows a coil comprising a core 46 and a cable 47 wound over it. The cable is that shown in Fig. 15. The eight wires making up the outer group are connected in series with each other as shown, to assist one another magnetically, and the ends 38s and 45f are connected to the ends 36f and 36s respectively of the inner wire 36 so as to oppose the magnetic effects of the inner and outer wires. A coil results in which the outer wires are very long as compared with the inner one and in which the flux interlinkage is practically 100%.

Fig. 17 is an elevational view of two conductors twisted together to form the duplex conductor of my invention. The conductors 48 and 49 in this case, being substantially the same length and cross-section, must be of different temperature coefficients of resistance. In this way, equal temperature rises effect disproportionate changes in resistance in the conductors and unequal current division. The opposing magnetic effect of the two conductors is obtained by connecting the conductors in parallel in the circuit in such a manner that the currents are in opposite directions in the wires, that is, 48s is connected to 49f and 49s to 48f, and the circuit connections, 50, made at these junctions. This construction affords a maximum of magnetic opposition since the conductors are practically parallel.

The drawings and descriptions herein disclose various forms of my invention as applied to electromagnetic conductors, electromagnets and reactors. In my copending applications Serial Nos. 416,877, filed December 27, 1929, 608,095, filed April 28, 1932, and 671,767, filed May 18, 1933, I show electromagnets, reactors, transformers, motors, control systems, and a number of other devices, and various applications of same in which slow electromagnetic effects produce desired functions. It is to be understood that I may adapt the conductors disclosed herein and the coils shown and described herein for use in any of the instances mentioned in these prior patent applications to which they are suited.

Coils embodying this invention may be connected in series between a source of supply and a load, or in parallel with a source of supply, or connected in any manner so that the slow electromagnetic effect may be utilized. In the claims which follow, it is to be understood that the coils and conductors claimed may be connected to a source of supply in any manner shown in the applications cited or in any other suitable manner.

While I have described my invention in certain of its preferred embodiments, I desire that it be understood that modifications may be made and that no limitations upon my invention are intended other than are imposed by the scope of the appended claims.

What I claim as new and desire to secure by Letters Patent of the United States is as follows:

1. An electric coil whose magnetism changes with time for connection in a supply system having as its winding a pair of conductors connected in parallel and in magnetic opposition, the outer conductor wound in spiral formation over the inner conductor and insulated therefrom, said conductors having different temperature coefficients of resistance.

2. A coil as in claim 1 in which the outer conductor has a relatively high temperature coefficient of resistance and the inner conductor a relatively low temperature coefficient of resistance.

3. A coil as in claim 1 in which the outer conductor has a relatively low temperature coefficient of resistance and the inner conductor a relatively high temperature coefficient of resistance.

4. A coil as in claim 1, the inner conductor of low temperature coefficient of resistance material, the outer conductor of high temperature coefficient of resistance material, the total resistance of the inner conductor equal to the total resistance of the uoter conductor at a selected temperature.

5. A coil as in claim 1 having heat insulation between the inner and outer conductors.

6. A coil as in claim 1, the inner conductor of an alloy having a relatively low temperature coefficient of resistance and high specific resistance, the outer conductor of pure metal having a relatively high coefficient of resistance and low specific resistance.

7. An electric coil whose magnetism changes with time having as its winding an inner conductor surrounded by an outer conductor, the conductors connected in parallel and in magnetic opposition, the inner conductor of different temperature coefficient of resistance material from the outer conductor, and insulation separating the various conductors, said coil being adapted for connection in a supply system.

8. An electric coil whose magnetism changes with time having as its winding a cable comprising an inner conductor surrounded by a multiple outer conductor, insulation between said conductors, the strands of the multiple conductor connected in series and the series connected in parallel magnetic opposition to the inner conductor, the inner conductor of different temperature coefficient of resistance material from the outer conductor.

9. An electric coil whose magnetism changes with the temperature of its winding, said winding comprising a pair of conductors insulated from each other, having different temperature coefficients of resistance and connected in parallel in magnetic opposition, one conductor arranged to surround the other so that substantially all magnetism originating in one threads through the other, and connections from the junction points of the inner and outer conductors for leading current to and from said coil.

10. As an article of manufacture, an electric coil whose magnetism changes with temperature, having as its winding a duplex cable, said cable comprising a central conductor having an outer conductor of a different temperature coefficient of resistance material wound over it in spiral formation, said two conductors connected in parallel and in magnetic opposition in a supply system, and heat and electrical insulation means for both conductors.

11. An electric coil whose magnetism changes with the temperature of its winding, said winding consisting of an inner conductor having an outer conductor wound on it in spiral formation and insulated therefrom, the inner conductor of negative temperature coefficient of resistance material and the outer conductor of positive temperature coefficient material, the conductors connected in parallel, in magnetic opposition and to a supply system.

12. An electric coil whose magnetism changes with the temperature of its winding, said winding consisting of an inner conductor having an outer conductor of a different temperature coefficient of resistance wound on it in spiral formation and insulated therefrom, one of the conductors having a negative temperature coefficient of resistance, the conductors connected in parallel, in magnetic opposition and to a supply system.

13. An electric coil whose magnetism changes with the temperature of its winding, said winding consisting of an inner conductor having an outer conductor of a different temperature coefficient of resistance wound on it in spiral formation and insulated therefrom, the inner conductor comprising a conductor tube of low or zero temperature coefficient of resistance material, and a filling for said tube constituted by comminuted material having a different temperature coefficient than the outer conductor, said inner and outer conductors being connected in parallel and in magnetic opposition.

14. An alternating current coil whose magnetism changes with the temperature of its winding, said winding consisting of an inner conductor having an outer conductor of different temperature coefficient of resistance wound on it in spiral formation, one conductor made up of two metals, one forming a concentric shell welded over the other, the two said metals having approximately equal temperature coefficients of resistance but different specific resistances, the spiral conductor and the inner conductor insulated from each other, connected in parallel, in magnetic opposition and to a supply system.

15. An alternating current electric coil whose magnetism changes with the temperature of its winding, said winding comprising a pair of conductors of different temperature coefficients of resistance connected in parallel, in magnetic opposition and to a supply system, the inner conductor made of two different metals, one welded over the other as a concentric shell, the outer conductor insulated from and surrounding the inner one so as to provide substantially complete flux interlinkage.

16. An alternating current coil whose magnetism changes with the temperature of its winding, having as its winding a pair of conductors connected in parallel and in magnetic opposition, at least one of said conductors made of two different metals, one welded over the other as a concentric shell, the bimetal conductor proportioned so that skin effect will force a higher current density into the metal forming the shell over the other, and thus change the magnetism of the coil to a greater degree than if there were no skin effect.

17. An electric coil whose magnetism changes with time comprising in part a single conductor winding for operation at temperatures below 50° C. and in part a duplex conductor winding for operation at temperatures of 50° C. or above, the two connected in series and to a supply system, the duplex conductor winding made up of an inner conductor of low temperature coefficient of resistance material with an outer conductor of high temperature coefficient of resistance material wound over the inner one in spiral formation, the spiral conductor and the inner one insulated from each other, connected in parallel and in magnetic opposition.

18. An electric coil whose magnetism changes with time comprising in part a single conductor winding for operation at temperatures below 50° C. and in part a duplex conductor winding for operation at temperatures of 50° C. or above, the two connected in parallel and to a supply system, the duplex conductor winding made up of an inner conductor of low temperature coefficient of resistance material with an outer conductor of high temperature coefficient of resistance material wound over the inner one in spiral formation, the spiral conductor and the inner one insulated from each other, connected in parallel, and in magnetic opposition.

19. An electric coil whose magnetism varies with time, having as the magnetism varying means therein a winding formed of a duplex conductor comprising two conductors circumferentially disposed one with respect to the other, said conductors connected in parallel and in magnetic opposition, the composition of said conductors providing means for altering the effective magnetism of said duplex conductor and said electric coil over a predetermined time period.

20. An alternating current coil whose magnetism changes with the temperature of its winding, the winding consisting of an inner conductor having an outer conductor of a different temperature coefficient of resistance wound on it in spiral formation, one conductor made up of two metals, one forming a concentric shell welded over the other, the spiral conductor and the inner conductor insulated from each other, connected in parallel, in magnetic opposition, and to a supply system.

21. As an article of manufacture, an electric coil whose magnetism changes with temperature, having as its winding a duplex cable, said cable comprising two conductors twisted together in a long spiral, said conductors having different temperature coefficients of resistance, means for connecting the two conductors in parallel, in magnetic opposition, and heat and electrical insulation means for both conductors.

22. An electric coil whose magnetism changes with the temperature of its winding, said winding being formed of a duplex cable having an inner conductor and an outer conductor wound over the inner one in spiral formation and insulated therefrom, said inner conductor comprising a plurality of separately insulated strands connected in series, said series connection disposed in parallel with said spirally wound outer conductor and arranged for magnetic coaction therewith.

23. An electric coil whose magnetism changes with the temperature of its winding, said winding being formed of a duplex cable having an inner conductor and an outer conductor wound over the inner one in spiral formation and insulated therefrom, said inner conductor comprising a plurality of separately insulated strands connected in parallel, said parallel connection disposed in parallel with said spirally wound outer conductor and arranged for magnetic coaction therewith.

24. A coil as in claim 1, in which the temperature coefficients of the inner and outer conductors are proportioned, one to the other, to make the total resistance of the inner conductor equal to the total resistance of the outer conductor at a selected temperature.

25. A coil as in claim 1, in which one of said conductors is constituted by material having a negative temperature coefficient of resistance.

26. An electric coil, whose magnetism changes with time, for connection in a supply system, having as its winding a pair of conductors connected in parallel and in magnetic opposition, the outer conductor wound in spiral formation over the inner conductor and insulated therefrom, said inner and outer conductors constituted by materials having the same temperature coefficients of resistance, the unequal rates of heat production in and heat dissipation from said inner and outer conductors constituting means to cause them to rise to different temperatures with passage of current and alter the magnetism of said coil.

ALBERT B. RYPINSKI.